Figure 1:
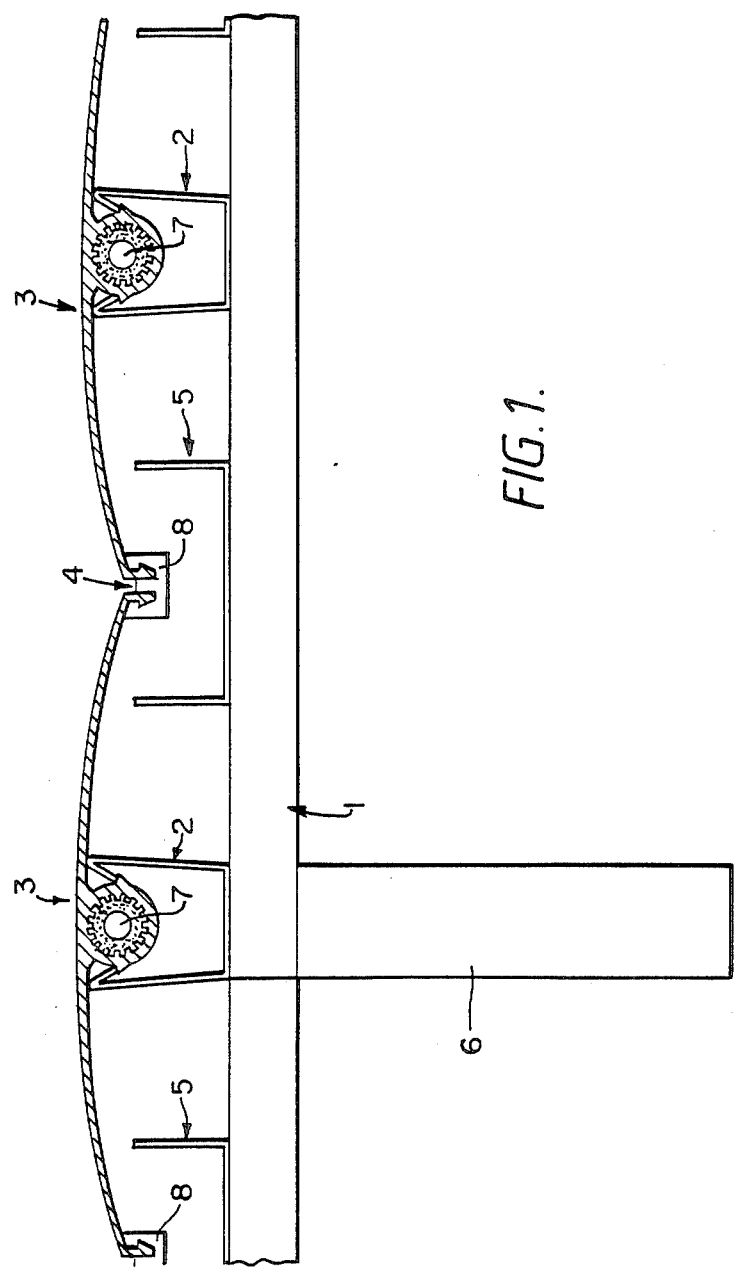

United States Patent [19]

Moore

[11] Patent Number: 4,738,247
[45] Date of Patent: Apr. 19, 1988

[54] ROOF INSTALLATIONS

[76] Inventor: Barrie P. Moore, 25 Prideaux Road, London, England, SW9 9LO

[21] Appl. No.: 887,832
[22] PCT Filed: Oct. 31, 1985
[86] PCT No.: PCT/GB85/00495
  § 371 Date: Jun. 30, 1986
  § 102(e) Date: Jun. 30, 1986
[87] PCT Pub. No.: WO86/02713
  PCT Pub. Date: May 9, 1986

[30] Foreign Application Priority Data
  Nov. 1, 1984 [GB] United Kingdom ............... 8427594
  Dec. 11, 1984 [GB] United Kingdom ............... 8431156

[51] Int. Cl.$^4$ .............................................. F24J 2/32
[52] U.S. Cl. ........................... 126/433; 126/446; 126/448; 126/DIG. 2
[58] Field of Search ......... 126/448, 446, 443, DIG. 2, 126/433

[56] References Cited

U.S. PATENT DOCUMENTS

| 3,996,919 | 12/1976 | Hepp | 126/433 |
| 4,086,913 | 5/1978 | Gavin | 126/446 |
| 4,127,105 | 11/1978 | Watt | 126/433 |
| 4,319,437 | 3/1982 | Murphy | 126/DIG. 2 |
| 4,392,539 | 7/1983 | Franklin | 126/446 X |

FOREIGN PATENT DOCUMENTS

| 0014355 | 8/1980 | European Pat. Off. . |
| 0028112 | 5/1981 | European Pat. Off. . |
| 0038556 | 3/1984 | Japan | 126/DIG. 2 |

Primary Examiner—Larry Jones
Attorney, Agent, or Firm—Cushman, Darby & Cushman

[57] ABSTRACT

Roof installations consisting of an array of interfitting members e.g. tiles, strips (3), slats or the like which interfit to form a roof covering and a set of heat pipes (7) which run parallel to the plane of the roof (6,1). Heat is abstracted from the heat pipes and used directly or indirectly, e.g. via a heat pump apparatus. Solar energy may thus be captured, as well as ambient energy, e.g. arising from the building below.

7 Claims, 5 Drawing Sheets

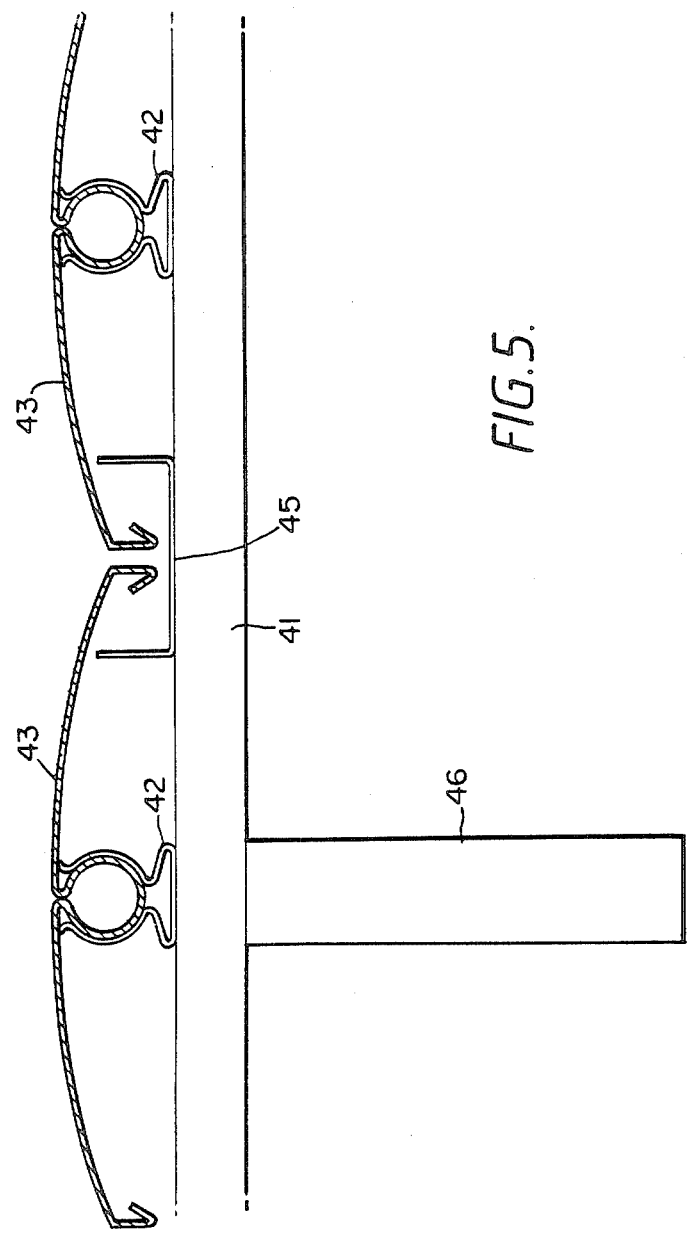

ROOF INSTALLATIONS

This invention relates to roof installations, particularly adapted to collecting solar energy.

For some years attempts have been made to make use of the energy falling on roofs from solar radiation. The classical approach has been to mount so-called solar panels on the roof, these generally consisting of some form of sandwich or tubular construction through which a working fluid, usually water, was passed, the construction being designed to be heat absorbing e.g. by being matte black. Such systems are expensive in terms of capital cost, prone to difficulties of sealing, corrosion and clogging in use, and tend not to blend aesthetically with the roof structure. Although they allow impinging radiant energy to be used, conversion efficiencies are very low.

Some devices of this type attempt to rely on the so-called greenhouse effect of a trapped body of circulating air. Such types are particularly prone to severe difficulties in operation due to condensation of trapped water vapour.

Typical complex constructions of this nature are described in U.S. Pat. Nos. 4,133,298 and 4,479,487 and in various citations listed in each of those two specifications.

Reliance upon heat absorption and thermal conductivity to secure adequate heat transfer is not universal. Proposals have been made to take advantage of the improved heat transfer properties of so-called heat pipes, closed systems in which a working fluid, for example a freon, is evaporated in one region of the pipe and condensed, giving up its latent heat of evaporation, in another region. U.S. Pat. Nos. 3,996,919, 4,067,315 and 4,122,356 show a number of ways in which heat pipes have been proposed for use in connection with the collection and use of solar energy.

None of the systems described in any of the specifications listed above is simple and straightforward to construct, nor is it particularly efficient in use. In particular, none of the systems attempts to integrate the collection of thermal solar energy with the construction of a sound weather-proof roof structure.

In accordance with the present invention, an array of heat pipes is used which is incorporated within a roof structure and in which the pipes run parallel to the plane of the roof structure.

Thus in accordance with a first feature of the present invention there is provided a roof installation comprising a set of interfitting members adapted to form a generally planar roof covering, a set of heat pipes consisting of closed tubes each containing a quantity of evaporatable liquid, the axes of the pipes running parallel to the plane of the roof covering, the pipes being in thermal contact with the interfitting members, and means for extracting heat from the heat pipes.

Such a system may be built into a flat roof but is preferably used in a pitched roof, the upper ends of a set of heat pipes being located adjacent the ridge of the roof. However, although that system works well, it is not necessary to run the heat pipes up and down the roof; they can run horizontally, either in a pitched roof or a flat one. Heat may be extracted from the upper end of non-horizontal heat pipes or from one or more positions in the case of horizontal heat pipes.

Heat pipes running generally parallel to the roof plane may be incorporated in a roof structure in a very wide variety of ways. One way of particular value is to locate each of the heat pipes in a tubular housing, either in one of the interfitting members of formed e.g. by two semi-cylindrical grooves in adjacent interfitting members. In such cases, the interfitting members are usually fairly long and e.g. in a pitched roof run from eaves to ridge. An alternative approach is to provide that each of the heat pipes is located in a set of aligned tubular housings in a corresponding set of interfitting members. For example a number of "tiles" may be threaded onto a heat pipe running from eaves to roof ridge, either directly or they may be threaded onto a tube which in turn contains a heat pipe.

The construction of the interfitting members must of course act as a roof i.e. it must keep out the weather and desirably look reasonable as a roof. In this connection, sets of tile members threaded on heat pipes or tubes may be employed to produce roofs looking very similar to traditional tiled roofs. Alternatively, longer sections may be used, e.g. running from eaves to ridge, and each containing a heat pipe. In such a case, each member may be in the form of a continuous pantile visually unbroken, or the surface may be configured to make it look like a set of separate items, simulating a tiled roof.

In roof installations in accordance with the present invention, heat is abstracted from the heat pipes by any convenient means. For example the ends of a set of heat pipes adjacent the ridge of a pitched roof may all terminate within a manifold through which a suitable liquid, e.g. a water/glycol mix, is circulated. As the liquid circulates it will remove heat from the end of each of the heat pipes. The heated circulating liquid may be used as a working fluid, e.g. in radiators, or it may be used indirectly to heat other water, e.g. for washing in, or it may flow through a circuit forming part of a heat pump installation of known type. Heat pump installations of various types are known and these may all be used in conjunction with installations according to the present invention. They are of considerable value in certain situations as they allow operation at below ambient air temperature thus enabling useful heat to be extracted from a roof even on cold days.

Heat transfer between the heat pipe and the set of interfitting members of planar roof covering may be enhanced e.g. by a suitably thermally conductive medium surrounding the heat pipe. Semi-liquid materials, e.g. as used to assist heat conduction in electronic environments, are usable.

The heat pipes themselves may be made of any convenient material. Preferred are tubes formed of aluminum or copper and including a working fluid such as a freon or water.

The interfitting members may be made of a wide variety of materials, and in a wide variety of shapes and sizes. One approach is to use traditional materials such as clay or concrete tiles and provide them with apertures through which the heat pipes or a tube to receive them may pass. The apertures are usually for convenience cylindrical though they need not be so. Alternatively the interfitting members may be made of suitable metal, for example fabricated metal sheet or extruded metal section. Extruded sections are of particular importance as they can be produced in substantial quantities once the extrusion dies have been manufactured. A further possibility is plastics units, e.g. made of polyester methyl methacrylate resins. The members may abut, overlap or be keyed together, and other configurations are possible. The members may be sealed or welded together, or adhered by suitable means. One roof may use more than one type of member.

Metal or plastics members may be finished e.g. with texturing, markings, contouring or the like to simulate, when assembled, the appearance of a traditional roof, e.g. a tiled or slated roof.

Figure 2:
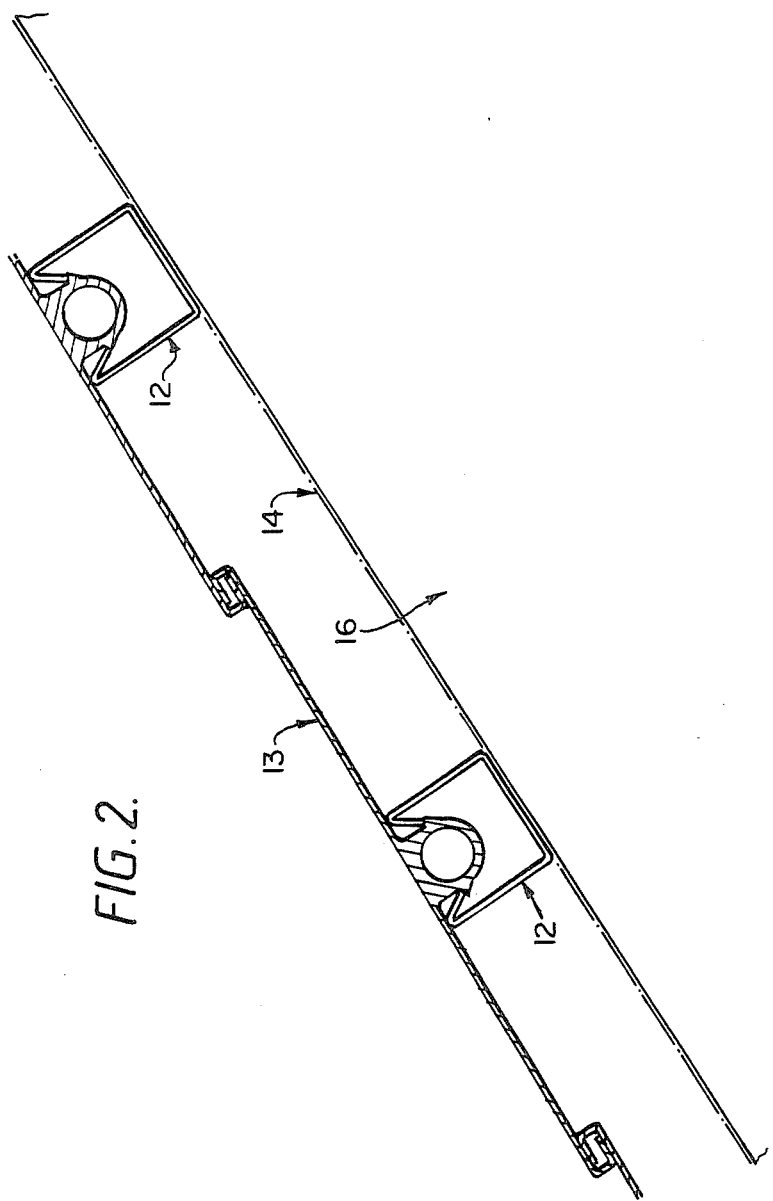

The invention is illustrated by way of example with reference to the accompanying drawings in which:

FIG. 1 is a diagrammatic illustration of a roof installation in according with the present invention, FIG. 2 is an alternative diagrammatic installation, and FIGS. 3, 3A, 4 and 5 show yet further alternatives.

Referring to FIG. 1, this shows diagrammatically a section of a roof construction. The roof is a conventional timber-framed pitch roof which consists of inclined rafters 6 running from the eaves to the ridge across which a plurality of horizontal battens 1 are fixed, the battens 1 normally being designed to hold tiles hung thereon.

In accordance with the invention, the roof cladding consists not of tiles but of a plurality of extruded metal sections 3 each running from the eaves of the building to the ridge of the roof. The central part of each extrusion consists of a generally hollow cylindrical section in which a heat pipe 7 is located. Adjacent sections 3 meet at 4 and are held relative to one another by clips 8, but there need be no attempt to seal two adjacent sections together where they meet at 4. Instead there are provided, likewise running from eaves to ridge, a set of vertically running inclined gutters 5, adapted to catch both leakage from without and condensation within. Each member 3 is held in position by a spring clip 2 mounted fixedly on top of the rafters 6 and battens 1. The wide collecting area of member 3 acts either to collect solar heat or heat from the building below and this is conducted to heat pipe 7. Heat is abstracted from the top end of the heat pipe which is located in a manifold through which a suitable liquid, e.g. glycol, is circulated to abstract the heat.

Referring now to FIG. 2, this shows an alternative arrangement in which the individual extruded sections run horizontally across a pitched roof rather than vertically up and down it. Each is held in place in a spring chair 12 each of which is directly fixed to the rafters 16 with the interposition of a damp-proof membrane or underslating 14 which is designed to protect the rafters 16 from the adverse effects of condensation. Again, heat may be extracted from members 13 by the use of heat pipes which fit into the central section of the member 13.

Figure 3:
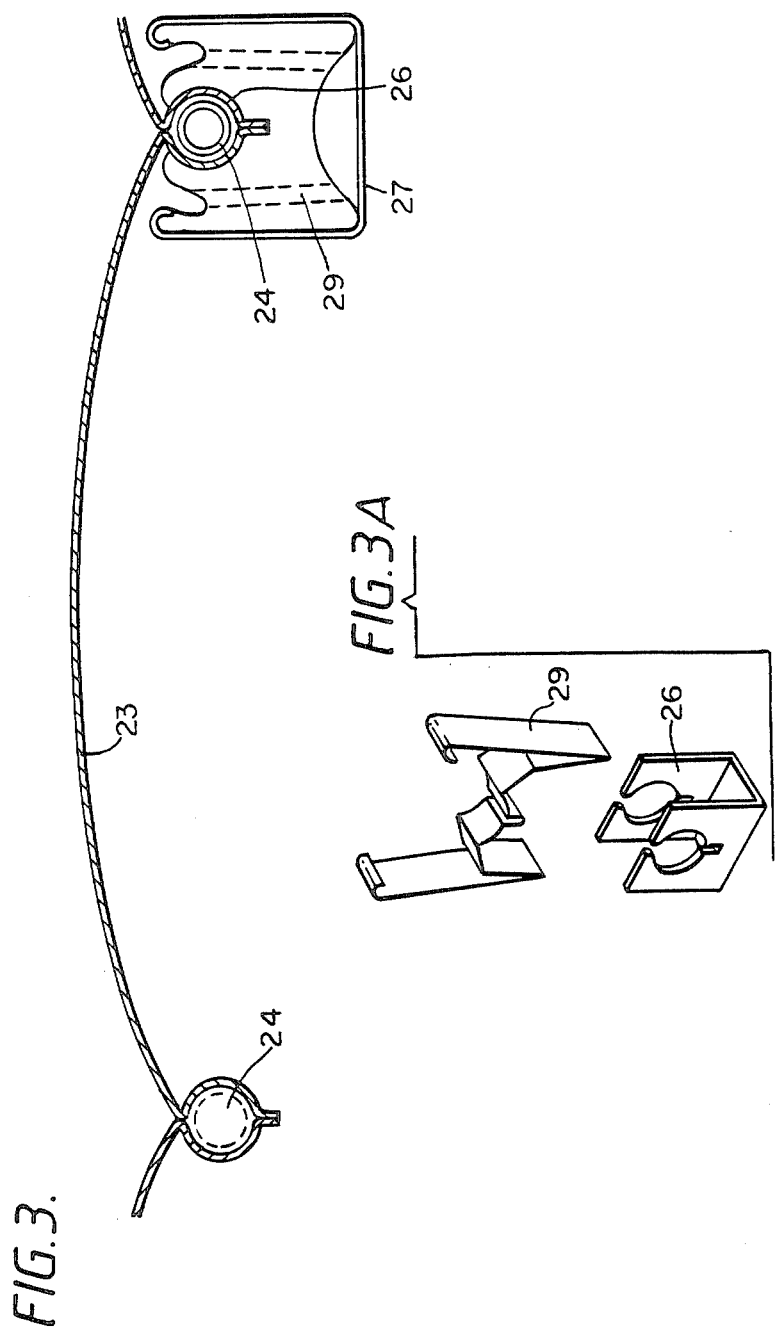

FIG. 3 shows a further alternative version in which a plurality of adjacent roof members 23 are assembled with heat pipes 24 between them. Members 23 are fabricated by cold rolling and each has on both its outer edges a semi-cylindrical groove such that two members 23, when placed adjacent one another define a cylindrical housing into which a heat pipe 24 may be inserted, either directly or in a sleeve.

The mating edges of members 23 are held together by clips 26 and in turn held into gutters 27 by spring clips 29 as shown. FIG. 3 includes perspective views of clips 26 and 29.

Figure 4:
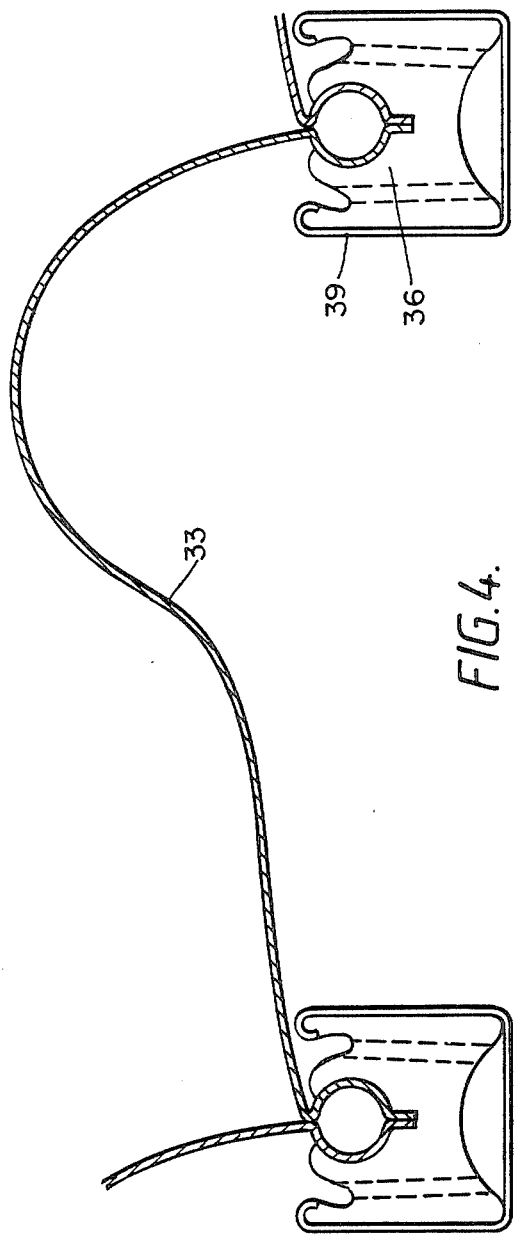

FIG. 4 shows a system analogous to FIG. 3 but with a pantile effect with asymmetric members 33. Clips 36 and 39 are analogous to clips 26 and 29.

FIG. 5 shows a simple version of the embodiment of FIG. 1 using pressed metal sections 43 set on spring clips 42 attached to battens 41 on joists 46. Drainage channels for rain water and condensation are provided at 45.

Thermal transfer between heat pipe and the remainder of the installation may be enhanced by ensuring that there is good thermal contact between them, either physically or via a suitable heat conductive lubricant, for example a mixture of an oil and zinc oxide.

The cross-section of the tubes may be circular, square, rectangular, oval, polygonal or other appropriate shape. The heat pipes may if desired be finned or otherwise treated to improve heat transfer.

What is claimed is:

1. A roof installation for a pitched roof comprising:
    a set of roof support members;
    a set of interfitting roof members with a curved underside and having peripheral edges lying in substantively the same plane and adjacent to one another arranged to form a roof covering thereover and defining a roof space therebetween;
    a set of heat pipes positioned in the roof space and arranged to extend substantially from the ridge to eaves of the roof, each pipe consisting of a closed tube containing a quantity of evaporatable liquid and being in thermal contact with the roof covering substantially along its entire length;
    a plurality of channel members mounted in the roof space and positioned below the peripheral edges of the panels, wherein the channel members are operable to collect rain entering the space and condensation formed in the space; and
    support means mounted on the roof support members and operable to support the interfitting roof members at the locations of the heat pipes.

2. A roof installation according to claim 1, wherein the interfitting roof members are formed by extrusion, and the heat pipes are mounted within channels formed in the extruded members.

3. A roof installation according to claim 2, wherein the channels are tubular and are formed along the centre of each extruded member, each member having an associated heat pipe.

4. A roof installation according to claim 2, wherein the channels are formed at the edges of the extruded member whereby the edges of two edges of the adjacent members define a tubular housing for a heat pipe.

5. A roof installation according to claim 1, wherein the interfitting roof members are shaped to improve the collection of condensation, the channel members being positioned in the roof space accordingly.

6. A roof installation according to claim 5, wherein the interfitting roof member have a substantially arched crosssection, the channel members being positioned adjacent the lowest point of the arch.

7. A roof installation according to claim 1, wherein heat is extracted from the heat pipes at the ridge end of each pipe.

* * * * *